Dec. 20, 1960 P. M. STIVENDER 2,965,115
GOVERNOR
Filed June 15, 1955 5 Sheets-Sheet 1

Fig. 1

INVENTOR
Paul M. Stivender
BY
J. C. Thorpe
ATTORNEY

Dec. 20, 1960 P. M. STIVENDER 2,965,115
GOVERNOR
Filed June 15, 1955 5 Sheets-Sheet 3

Fig. 3

INVENTOR
Paul M. Stivender
BY
S. C. Thape
ATTORNEY

Dec. 20, 1960 P. M. STIVENDER 2,965,115
GOVERNOR
Filed June 15, 1955 5 Sheets-Sheet 4

INVENTOR
Paul M. Stivender
BY
S. C. Thorpe
ATTORNEY

Dec. 20, 1960 P. M. STIVENDER 2,965,115
GOVERNOR
Filed June 15, 1955 5 Sheets-Sheet 5

INVENTOR
Paul M. Stivender
BY
J. C. Thorpe
ATTORNEY

United States Patent Office 2,965,115
Patented Dec. 20, 1960

2,965,115
GOVERNOR

Paul M. Stivender, South Euclid, Ohio, assignor to General Motors Corporation, Detroit, Mich., a corporation of Delaware Filed June 15, 1955, Ser. No. 515,691

23 Claims. (Cl. 137—34)

This invention relates to a governor mechanism responsively operative to regulate an operating condition of a primary mechanism associated therewith.

For illustrative purposes, the invention is described and illustrated as incorporated into a governor mechanism particularly adapted to regulate the operating speed of a prime mover, and more particularly as incorporated into a governor mechanism of a hydraulic centrifugal type such as shown in the United States Patents 2,219,229, issued October 22, 1940; 2,324,514, issued July 20, 1943; 2,324,515, issued July 20, 1943; and 2,466,438, issued April 5, 1949; all of which have issued in the name of Albert Kalin.

In such governor mechanisms, the speed of the prime mover is controlled by balancing counterforces applied to a speed-controlling element by a controllable speed-increasing biasing means and by a speed-responsive means which tends to actuate the speed-controlling member in a speed-decreasing direction. In the aforementioned patented governor mechanism, speed adjustment or control is accomplished by compressing a speeder spring to vary the force the speeder spring exerts on the speed-controlling element thereby varying the speed at which a balance is obtained between the speeder spring and the speed-responsive mechanism.

It is a principal object of the invention to provide such a governor with an electromagnetic speed-increasing biasing means.

Another principal object of the invention is to provide such a governor with an electromagnetic biasing means acting in parallel with and independently of the speeder spring and being capable of remote speed-controlling adjustment to thereby provide remote control of the prime mover speed.

A further and more specific object of the invention is to provide such a governor with a solenoid energizable to provide a variable speed-controlling force counter to the force exerted on the speed control member by the speed-responsive means and which is thereby capable of controlling the prime mover speed from a plurality of control stations remote from the governor mechanism.

It is also among the several objects of the invention to provide an improved solenoid mechanism having relatively high-intensity fields and having a rotatably driven armature coacting therewith to achieve relatively high rates of positive load deflection in the normal operating range of the solenoid mechanism.

A positive rate or scale is defined as a "force-displacement characteristic" that increases in force with displacement against its own force whereas a negative scale decreases in force with displacement against itself. As an example, a spring increases in force as it is displaced against its own force and this is referred to as having a positive rate or positive scale, and a short, stiff, small diameter spring has a higher positive scale than a long, soft, large diameter spring. An example of a device having a negative scale is an ordinary horseshoe magnet. As the armature is displaced against the force of the magnet, the pull decreases. A dead weight is an example of zero scale since its weight or force does not change with displacement. Displacement or deflection scale is measured in pounds per inch displacement.

An essential reason for providing a governor such as illustrated with a speeder spring or solenoid of sufficient positive scale is that it is balanced against a simple right-angle bell-crank type of flyball. This type of flyball when displaced against its own output force has a decreasing force with respect to axial displacement; i.e., a negative scale. If a solenoid, a zero scale dead weight, or a long, soft speeder spring having a negative, zero, or a positive scale less than the negative scale of the flyball, respectively, is balanced against the flyball and a slight movement takes place, the flyball will immediately tend to open up full or collapse, depending upon which way it is moving. For stabiity, the algebraic sum of the scale of the devices opposing each other must be positive. On the other hand, this sum of scale must not be of too high a positive value, otherwise, the speed displacement characteristics of the speed control member will not be sufficient to obtain fast regulation.

Another design consideration in the development of a hydraulic type centrifugal governor is to compensate for the relatively rapid increase in the negative scale of the flyball which occurs with increasing speed. Since the flyball negative scale increases as the square of the speed, substantially the same fast rate of increase of positive scale of the speed-increasing biasing is required to insure proper speed control sensitivity under all speed and load conditions. In most hydraulic governors, such compensation is generally accomplished by using a conical spring. The large diameter turns will collapse first under pressure, reducing the amount of active turns and also reducing the average diameter of the remaining active turns which results in a fast-increasing scale with spring displacement. In some cases, fluid-operated compensating means may also be utililed in such governors as disclosed in the aforementioned patents to Kalin.

To compensate for the rapid increase in negative flyball scale with increasing speed in such a governor, the invention contemplates the use of a solenoid having a correspondingly fast increase in positive scale with increase in current. As the flyball force varies as the square of the speed while the solenoid force varies approximately as the square of the current, it should be noted that there is a fairly close linear relation between the speed and current.

The foregoing and other objects, advantages, and features of the invention will be more thoroughly understood from the following description of a preferred embodiment thereof in which reference is made to the accompanying drawings, in which.

As stated above, the invention will be described only as adapted to regulate the speed of a prime mover but without intent to limit the invention to that use. The governor may be made responsive to any operating condition as well known in the art.

Figure 1:
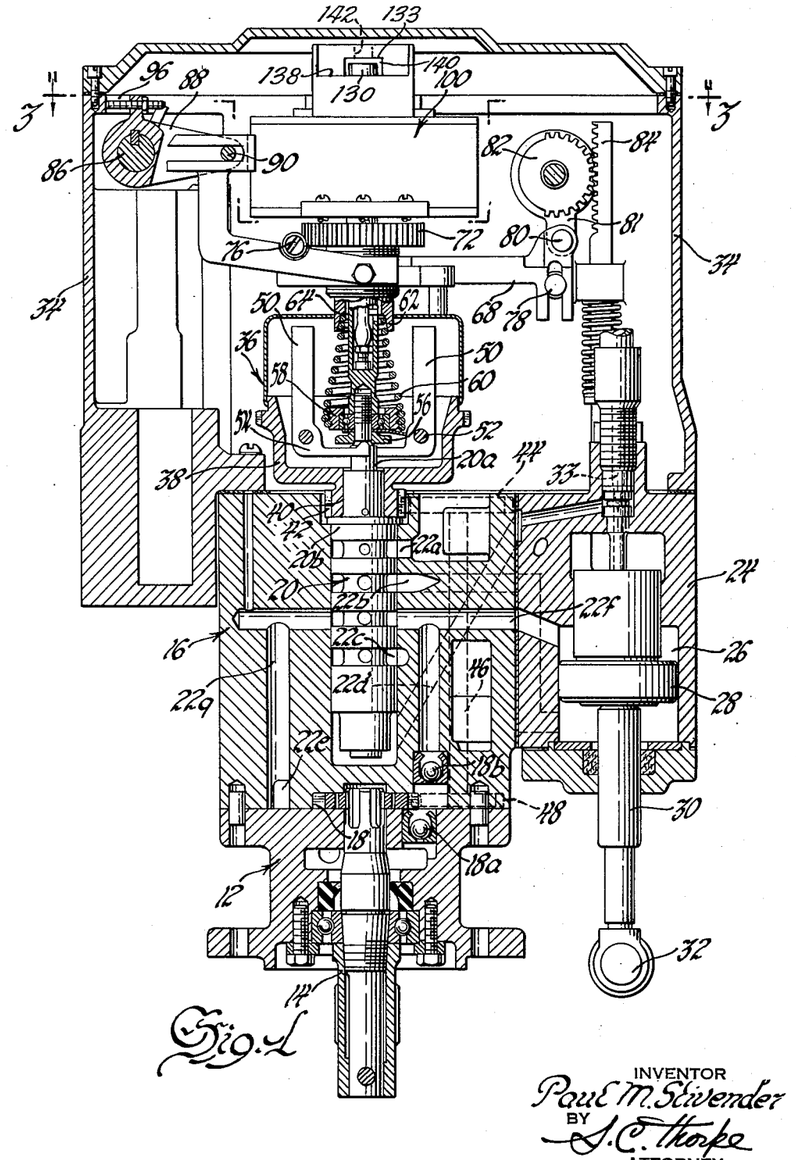
Figure 1 is a vertical sectional view of the governor taken substantially on the line 1—1 of Figure 3.

Referring more particularly to the drawings, Figure 1 shows a preferred embodiment of the invention in a governor of the type disclosed in the Kalin patents. This governor includes an adapter base 12 mountable on the prime mover, not shown. The adapter base rotatably mounts a stub shaft 14 which is connectable at its lower end to the engine accessory drive mechanism. A power case 16 mounted immediately above the base 12 includes a gear-type pressure supply pump 18 driven by the upper end of stub shaft 14 having inlet and outlet check valves 18a and 18b, respectively; a rotatable pilot valve assembly 20 including a pilot valve 20a and a valve sleeve 20b; a plurality of fluid passages 22a, b, c, d, e, f, and g controllable by the pilot valve 20a; and fluid pressure accumulators, not shown, connected to the pump outlet by passages 22f and 22g.

A cylinder block 24 is mounted to one side of the power case and has a stepped cylinder 26 formed therein reciprocably mounting a servo-motor piston 28. The cylinder block 24 is provided with suitable passages interconnecting the passages of the power case 16 with the stepped cylinder 26. A piston rod 30 carried by the piston 28 projects from the cylinder 24 and is connectable at 32 to the speed control linkages, not shown, of the prime mover; e.g., the fuel control linkages of an internal combustion engine. The speed-controlling operative position of the piston 28 is controlled by the position of the pilot valve and a compensating needle valve 33 in the manner described in the aforementioned Kalin patents.

The power case 16 and the servomotor cylinder block 24 serve to mount a speeder case 34. A flyball head 36 within the speeder case includes an upwardly facing cup-shaped member 38 which is secured, as indicated at 40, to the upper end of the sleeve 20b which is rotatably journaled in the pilot valve bore provided in the power case. The portion of the cup 38 embracing the sleeve 20b is geared externally at 42 to mesh with a driving gear 44 mounted on a shaft 46 which is in turn driven by a gear 48 meshing with one of the gears of the engine-driven gear pump 18. Two right-angle bell-crank type flyballs 50 are pivotally mounted on pins 52 which and carried by the cup 38. The flyballs 50 have inwardly extending arms 54 in thrust engagement with a washer 56 carried by the pilot valve 20a. When the flyballs are centrifuged outwardly in response to speed, the arms 54 tend to cause the pilot valve 20a to move upwardly in a speed-decreasing direction. The pilot valve 20a also carries a ball bearing mounted speeder spring seat 58 immediately above the washer 56 which serves to seat the large diameter end of a conical speeder spring 60. The smaller diameter upper end of the speeder spring 60 is seated in a frusto-conical counterbore 62 formed in one end of an externally threaded sleeve member 64. The sleeve member 64 threadably engages a member 66 which is pivotally mounted on a speed-adjusting lever 68 by pins 70. As best seen in Figures 2, 3, 4, and 6, the member 64 has a gear 72 formed integrally thereof which engages an idle-speed adjusting worm gear 74 rotatably carried by the member 66. The worm 74 is provided with a screw-driver type slot 76 whereby the worm 74 may be rotated to rotate the sleeve 64 to adjust the idle-speed biasing effect or setting of the speeder spring 60 and thereby the speed range of the governor as effected by a given angular movement of the speed adjusting lever 68.

Figure 2:
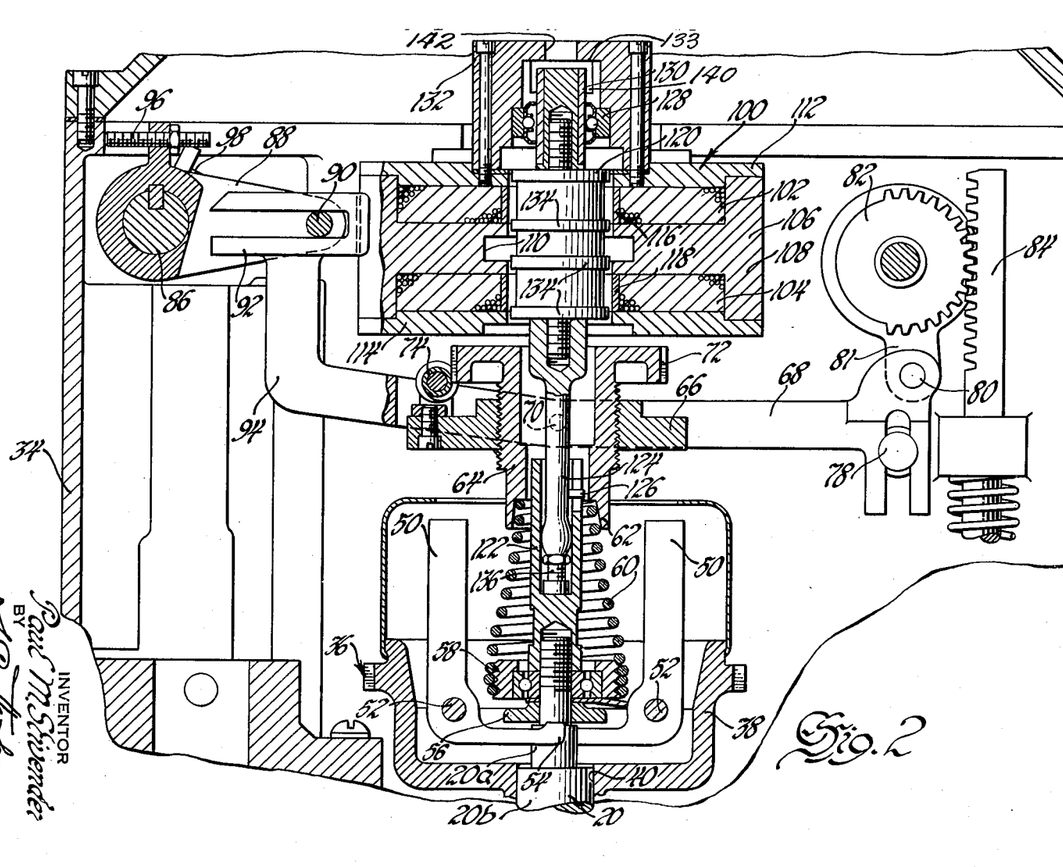
Figure 2 is an enlarged and more detailed sectional view of a portion of Figure 1.
Figure 3:
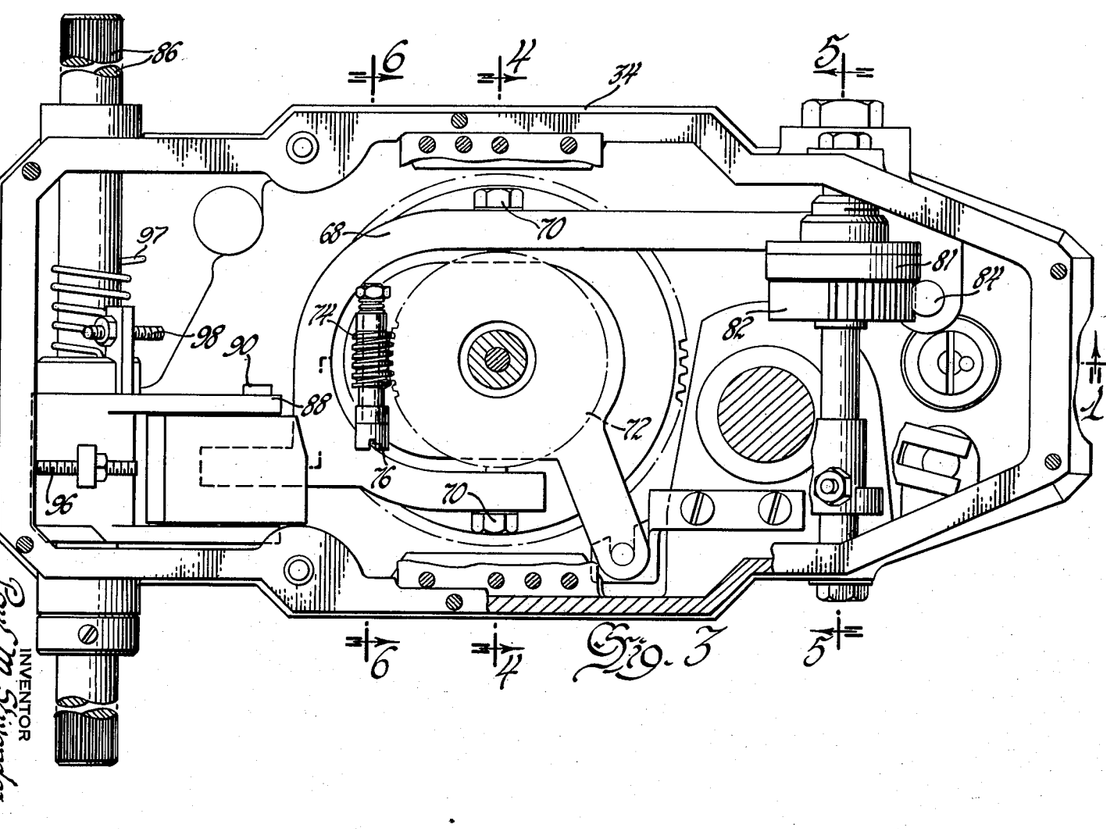
Figure 3 is a plan view of the governor taken in the plane of the line 3—3 of Figure 1.

A manually operable speed control shaft 86 rotatably journaled in the speeder casing adjacent the left end of the speed control lever 68, as seen in Figures 1, 2, and 3, has a bifurcated lever 88 keyed thereon, the parallel arms of which carry a pin 90 which forms a pivotal lost-motion connection with a jaw-shaped slotted head 92 formed on the upstanding end 94 of the lever 68. The lever 88 carries stop screws 96 and 98 which abut suitable surfaces of the speeder case 34 to provide idle and maximum speed-adjusting positions for the speed control levers 68 and 88. A spring 97 embraces the speed control shaft and is torsionally interposed between the speeder case 34 and the lever 88 to normally assist the speeder spring in biasing the control shaft 86 and the lever 88 in a direction to maintain abutment between the idle stop screw 96 and the speeder case.

Figure 5:
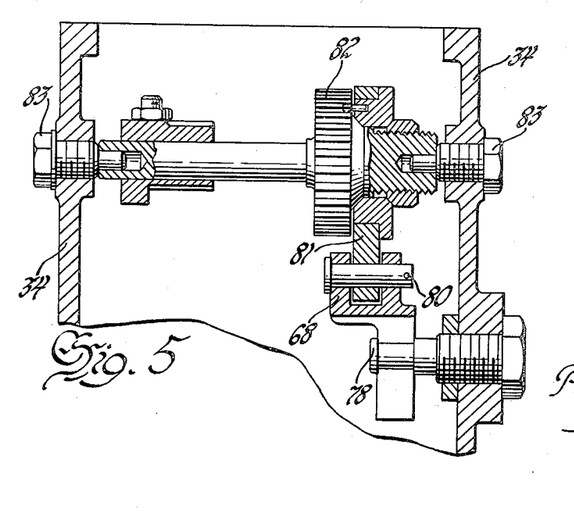
Figure 5 is a sectional view taken substantially in the plane of the line 5—5 of Figure 3.
Figure 6:
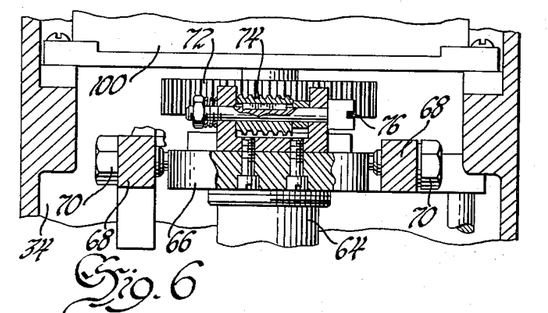
Figure 6 is a sectional view taken substantially in the plane of the line 6—6 of Figure 3.

As seen in Figures 1, 2, and 5, the right end of the speed-adjusting lever 68 is provided with a slotted lost-motion pivotal connection about a pin 78 which is carried by the speeder case 34 and a second pivotal connection at 80 with a lever arm 81 of a sector gear 82. The sector gear 82 which is pivotally mounted on the speeder case by pins 83 engages a servomotor position-indicating rack 84 to modify the droop characteristics of the governor in the manner disclosed in Kalin 2,324,514.

As indicated above, the invention contempltaes the addition of a solenoid mechanism to such a conventional governor mechanism as hereinbefore described; the solenoid being energizable to provide relatively high intensity fields which are operable through a rotatably driven armature to exert speed-increasing biasing force capable of acting in parallel with and independently of the speeder spring to counter the force exerted on the speed-controlling pilot valve member by the speed-responsive flyball mechanism.

In accordance with the invention, the solenoid mechanism 100 comprises a pair of counterwound coaxially disposed field coil windings 102 and 104 which may be electrically connected either in series or in parallel. An annular magnetic housing 106 embraces and axially spaces the field coil windings 102 and 104 and is so formed as to provide relatively sharp-edged magnetic poles adjacent the inner axial ends of the field coil windings. The housing 106 comprises the intermediate pole piece 108 which is recessed at 110 to provide adjacent sharp-edged poles of like polarity and the end pole pieces 112 and 114 which provide sharp-edged poles of the opposite polarity. The opposite pole pieces 112, 108, and 114 of the field coil windings 102 and 104, respectively, are separated by nonmagnetic rings 116 and 118 lining the inner diameter of their respective field coil windings.

An armature 120 of magnetic material mounted in the center of the solenoid mechanism is rotatably driven by the combined pilot valve and flyball mechanism through a pilot valve extension member 122 having an internal bore in the upper end thereof forming a crosshead slidably mounting the spherical end of a connecting rod 124 carried by the armature; a pin-and-slot connection indicated at 126 preventing relative rotation between the rod 124 and the member 122. The upper end of the armature 120 in the illustrative embodiment is a separate member of reduced diameter having self-locking threaded adjustment with respect to the adjacent pole portion of the armature. This reduced diameter end portion is rotatably and reciprocably mounted by a suitable bearing 128 such as the ball bearing shown which has an elongated inner race 130 and is carried by a nonmagnetic housing 132 carried by the upper pole piece 112. The journal bearing is thus magnetically isolated from the solenoid housing 106. The armature 120 has four annular bosses 134 formed thereon which form substantially sharp-edged annular poles coacting with the sharp-edged annular poles of the solenoid to define relatively narrow high-intensity magnetic gaps therebetween. As the solenoid will exert zero axial force on the armature when the armature poles 134 are in their magnetic neutral position directly opposite the field poles, the armature is normally displaced slightly above this position by a predetermined amount when the flyballs 50 are centrifugally in balance with the combined speeder spring and solenoid biasing forces, the several elements being in their respective vertical opposing positions as shown in Figures 1 and 2. This position of the flyballs corresponds to the neutral position of the pilot valve 20a. The armature is adjusted to this offset or displaced position either by threadable self-locking adjustment of the connecting rod 124 relative to the pole portion of the armature or by an adjusting screw 136 which is carried by the pilot valve extension member 122 and abuts the rounded end of the rod 124. As best seen in Figure 2, the upper end of the nonmagnetic bearing housing 132 extends radially inwardly to provide an abutment or stop 133 limiting the maximum vertical displacement of the armature assembly 120 which may be effected by the outward speed responsive movement of the flyballs 50. The design of the solenoid and coacting armature is thus such that as the armature is displaced from its neutral position, the vertical component of force exerted by the solenoid is increased within the normal deflection limits of the solenoid permitted by the abutment of the bearing housing 132. As indicated above, this is positive deflection rate.

Figure 4:
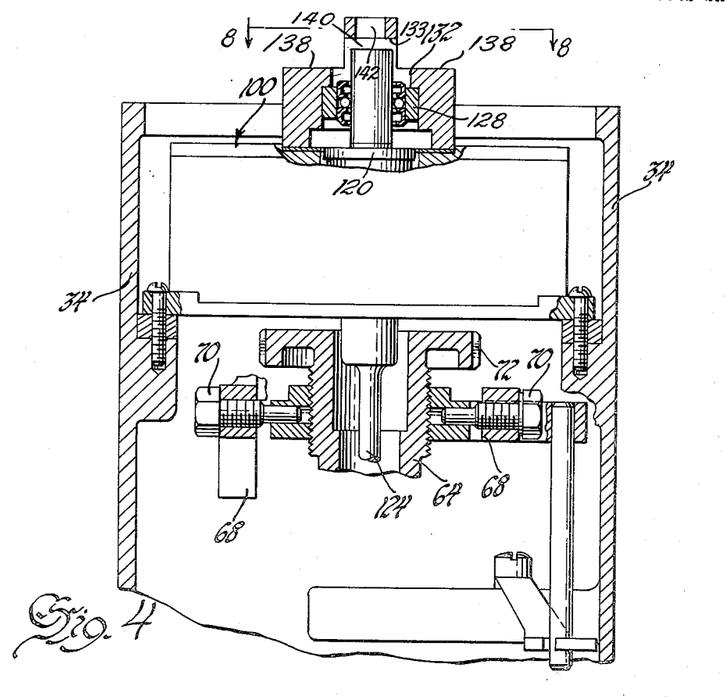
Figure 4 is a sectional view taken substantially in the plane of the line 4—4 of Figure 3.

As best seen in Figures 1, 2 and 4, the non-magnetic bearing housing 132 is preferably recessed or notched on opposite sides thereof, as indicated at 138, to intersect the bearing mounting bore therein to provide two diametrically opposite windows 140 for the visual observation of armature displacement. The abutment end of the bearing housing is also axially perforated as indicated at 142. Thus the upper end surface of the armature and opposite axial surfaces of the bearing housing provide easily observable and accessible surfaces for gauging whether the solenoid armature is offset the desired predetermined amount from its magnetic neutral position when the governor flyball head 36 is rotating at a suitable constant speed with the pilot valve 20a being in its neutral non-valving or equilibrium condition. Such gauging can be accomplished with a suitable gauge plug insertable in the housing aperture 142, a depth micrometer insertable therein, or by a feeler gauge insertable transversely through the windows 140. Such gauging might also be accomplished by providing the surfaces of the recesses 138 with suitable sight gauge markings alignable with the top surface of the armature through the housing windows 140. As indicated above, where the armature is determined as being in improper positional relationship under such equilibrium test conditions, adjustment to effect the proper predetermined relationship is effected either by threadable adjustment of the connecting rod 124 relative to the pole portion of the armature or by threadable adjustment of the screw 136. By rotating the armature in its guide bearings, a live oil film is provided at the bearing surfaces at all times. This rotation also overcomes the effects of static friction which would result from the tendency of the solenoid to pull the armature out of center. This pullover, if not corrected, would cause excessive friction of the pilot valve assembly and result in governor hunting. Rotation of the armature also tends to keep the air gap clean.

A governor mechanism embodying a solenoid biasing means in accordance with the invention has particular application where it is desirable to control the operation of the prime mover from one or more remote control stations. The immediate use of the illustrated preferred embodiment of this governor is on marine engines where it is desired to selectively control the engine from the pilot house, the engine room, or the afterdeck. More particularly, this governor is to replace the present system for remotely controlling the engine governor consisting of a governor such as cited in the patented art having a direct current Selsyn motor mounted on the side of the governor and operable to control engine speed by changing the biasing pressure on the speeder spring through gearing. The controls for such a system include relatively complex multiple-type phasing rheostats in the pilot house, and the system is relatively expensive.

Figures 7, 8:
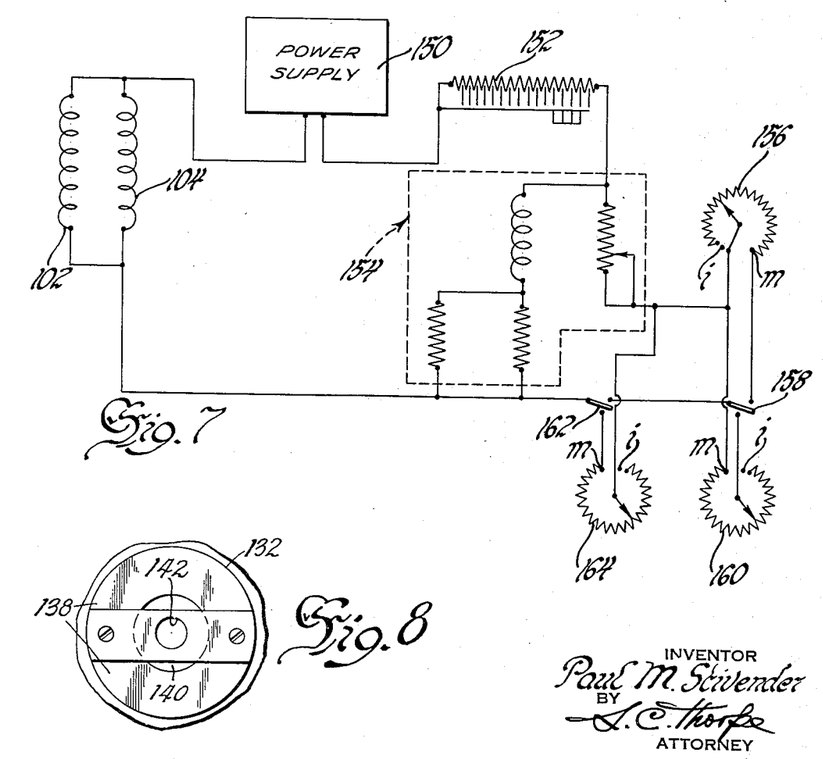
Figure 7 is a schematic diagram showing a remote control circuit for varying the speed-adjusting excitation of the engine governor solenoid.
Figure 8 is an elevational view taken substantially in the plane of the line 8—8 of Figure 4.

Figure 7 shows a schematic diagram of a suitable remote control system for a governor embodying the invention. This system, in addition to the paralleled field coil windings 102 and 104, includes a power supply 150, a current regulator 152, and paralleled alternative control rheostats 156, 160, and 164 for the pilot house, afterdeck, and engine room control stations, respectively, of the ship; all of which are in series with the paralleled windings. Transfer switches 158 and 162 are operable to select the particular rheostat in operative control of the governor solenoid. The electrical control system may also include temperature-compensating impedances indicated generally at 154 in series and parallel with the control rheostats and which compensate for solenoid temperature differentials which will occur in the normal operation of such a solenoid-biased governor mechanism. Since the resistance of the solenoid increases as the coil temperature rises, if such solenoid coil temperatures are not compensated for either manually or automatically, the reduction in current flowing through the field coil windings would result in a reduction of engine speed during a warm-up period.

From the foregoing, it is believed that the operation of the governor herein described and illustrated will be obvious to those skilled in the art, particularly in view of the aforementioned patented art. Briefly, this operation is as follows: The speeder spring 60 will normally be adjusted by the worm 74 and the gear 72 to provide sufficient speeder spring bias to maintain the engine operating at the desired idle speed for a given setting of the idle speed set screw 96. Adjustment of the engine idle speed may also be made by suitable adjustment of the idle speed set screws 96 which acts through the speed-adjusting levers 88 and 68 to limit the minimum biasing action of the speeder spring 60. When the controlling rheostat 156, 160, or 164, as determined by the position of the transfer switches 158 and 162, is in its idle position $i$, it will be in an open de-energized solenoid position; idle speed of the engine being controlled by the interaction of the flyballs and the speeder spring. As the rheostat is moved in a speed-increasing direction from the idle setting toward its maximum-speed controlling position $m$, the solenoid windings 102 and 104 will be progressively energized to exert a downward thrust on the rotating armature 120 corresponding in magnitude to the rheostat position. This thrust will tend to collapse the flyweights 50 and to move the speed-controlling pilot valve in a speed-increasing direction until the engine has come up to a speed corresponding to the control rheostat setting, at which speed the forces exerted on the pilot valve by the flyweights 50 will balance the thrust exerted on the solenoid armature. If the control rheostat is then moved to a decreased-speed position, the solenoid windings 102 and 104 will be de-energized a like amount thereby relieving a portion of the thrust exerted on the armature. This will permit the flyballs 50 to move radially outwardly and moving the pilot valve in a speed-decreasing direction until a new condition of equilibrium is established between the solenoid thrust and the centrifugal action of the flyballs at the desired reduced engine speed.

It is also contemplated that under certain operative conditions, it may be necessary to operate such a governor without the biasing action of the solenoid in case of power supply failure or when the electrical control system is rendered inoperative to supply the necessary solenoid current. In case of such a failure, the engine speed would drop to the speeder spring maintained idle speed. Operating at this governor-maintained idle speed, the engine would still deliver enough power for ship maneuvering in marine installations, and speeds above idle could be obtained by manual adjustment of the speeder spring bias to balance the speed-responsive force of the flyballs at the desired higher engine speed.

It is also contemplated that in some installations, it may be desirable to provide the total balancing force against the flyball by the excitation of the solenoid; the speeder spring being adjusted to its zero pressure position. Under such operative conditions, the speed of the engine or prime mover would be wholly dependent upon the remotely controlled solenoid current and the engine could similarly be shut down and started remotely by use of the governor control.

In certain applications, it might also be desirable to block the flyball and adjust the solenoid armature so that the solenoid thrust is upward against the speeder spring 60. The solenoid coils could then be excited by a small tachometer generator, not shown, geared to the engine and giving a voltage proportional to engine speed. In such an application, the solenoid thrust would increase in force with engine speed and would, in effect, replace the speed-responsive flyball force.

From the foregoing description of one specific embodiment of the invention, it will be quite apparent that the several objects of the invention are accomplished by the present construction. It will also be apparent to those skilled in the art to which this invention pertains that various modifications and changes may be made therein without departing from the spirit and scope of the invention as defined in the following claims.

I claim:

1. In a governor mechanism for regulating an operative condition of a primary mechanism associated therewith, the combination comprising a member operable to control said operative condition, means responsive to said operative condition tending to actuate said control member in a direction to decrease the magnitude of said operative condition, a first means biasing said control member in opposition to said condition-responsive means and tending to increase the magnitude of said operative condition, said first means including manually operable means effective to vary the magnitude of the operative condition increasing bias, and a second means selectively operable to bias said member in a direction to increase the magnitude of said operative condition, said second means including two solenoid windings of opposite polarity and of narrow axial dimension relative to the radial dimension thereof, a magnetic housing embracing said solenoid windings and having axially spaced sharp-edged annular poles formed thereon adjacent the inner surface of said solenoid windings, and a magnetic armature mounted to reciprocate within said solenoid housing, said armature having sharp-edged annular poles formed thereon coacting with and being normally offset from the poles of said magnetic housing so that energization of the solenoid windings causes the armature to be drawn into said solenoid housing with increasing force as said condition-controlling member is moved in a direction to decrease the magnitude of said operative condition.

2. In a governor mechanism, a member operable to control an operative condition, means responsive to said operative condition for actuating said control member in a direction to decrease the magnitude of said operative condition, a second means biasing said member in opposition to said first-mentioned means and being normally effective to limit the minimum operative condition, and a third means selectively operable to bias said member in opposition to said first-mentioned means to increase the magnitude of said operative condition above said minimum, said third means comprising a solenoid including a field coil winding of narrow axial dimension relative to the radial dimension thereof, a magnetic housing embracing said field coil winding and having axially spaced annular poles formed thereon adjacent the inner surface of said field coil winding, and a magnetic armature mounted to reciprocate within said solenoid housing, said armature having annular poles formed thereon normally offset from the poles of said magnetic housing so that energization of the field coil winding tends to cause the armature to be drawn into said solenoid housing with increasing force as said condition-controlling member is moved in a direction to decrease the magnitude of said operative condition by said first-mentioned means.

3. A governor mechanism for regulating an operative condition of a primary mechanism associated therewith comprising, in combination, a member operable to control said operative condition, means responsive to said operative condition and tending to actuate said member to decrease the magnitude of said operative condition and means selectively operable to bias said member in opposition to said condition-responsive means in a direction to increase the magnitude of said operative condition, said selectively operable means comprising a solenoid including a field coil winding of narrow axial dimension, a magnetic housing embracing said field coil winding having axially spaced annular poles formed thereon terminating adjacent the inner surface of said field coil winding, a magnetic armature reciprocably and rotatably mounted within said solenoid and means for rotating said armature within said solenoid, said armature having annular poles formed thereon normally offset from the poles of said magnetic housing so that the force tending to cause the armature to be drawn into said solenoid with energization of the field coil winding increases as said condition-controlling member is displaced in a direction to decrease the magnitude of said operative condition by said condition-responsive means.

4. A governor for a prime mover comprising, in combination, a member operable to control the speed of said prime mover, speed responsive means operable in response to increasing prime mover speed to move said member in a speed-decreasing direction, a speeder spring normally operative to bias said member in a speed-increasing direction in opposition to said speed responsive means, manual means for controlling the biasing effect of said speeder spring on said member between minimum and maximum biasing limits to thereby establish the prime mover speed at which the reactions of said speeder spring and said speed responsive means on said member are balanced, a solenoid including an armature reciprocably mounted and operatively connected to said speed control member independently with said speeder spring, said solenoid and armature having positive deflection rate characteristics and said solenoid being energizable to apply speed-increasing biasing action to said speed control member through said armature, and control means for varying the speed-increasing excitation of said solenoid.

5. In a power plant control mechanism, the combination including a member operable to control the speed of the prime mover, speed-responsive means operably connected to said member and tending to actuate said member in a speed-decreasing direction with increases in speed, solenoid means including an armature operatively connected to said speed-controlling member and energizable to bias said armature and said member in a speed-increasing direction in opposition to said speed-responsive means, said solenoid means and said armature having a positive deflection rate within the speed-controlling operative range of said member, and means for varying the speed-increasing energization of said solenoid.

6. In a centrifugal governor for a prime mover, a member operable to control the speed of said prime mover, flyball mechanism operable to move said member in a speed-decreasing direction, said flyball mechanism having a negative deflection rate characteristic relative to said member, a speeder spring normally operative to bias said member in a speed-increasing direction, a solenoid device including an armature operatively connected to said speed control member independently of said speeder spring and energizable to apply additional speed-increasing biasing to said speed control member, both said solenoid and said spring coacting in opposition to said flyball mechanism to establish the speed-maintaining limits of the governor and having positive deflection rate characteristics relative to said member collectively exceeding the negative deflection rate of said flyball mechanism over the normal operating range of said governor, and control means including means for selectively varying the speed-increasing energization of said solenoid and means for selectively controlling the biasing effect of said speeder spring to thereby modify the prime mover speed at which the reactions of said speeder spring and said solenoid and the reaction of said flyball mechanism on said member are balanced.

7. In a centrifugal governor for a prime mover, a member operable to control the speed of said prime mover, flyball mechanism operable to move said member in a speed-decreasing direction, said flyball mechanism having a negative deflection rate characteristic, a solenoid device including an armature operatively connected to said speed control member, said solenoid having a positive deflection rate characteristic exceeding the negative deflection rate of said flyball mechanism over the normal operating range of said governor and being energizable to apply a speed-increasing biasing action on said speed control member in opposition to said flyball mechanism, and control means for varying the speed-increasing excitation of said solenoid.

8. In a centrifugal governor for a prime mover as set forth in claim 6, said solenoid device including a plurality of coaxially disposed annular field coil windings, the adjacent windings being oppositely wound to provide reversed polarity, an annular magnetic housing embracing said field coil windings and having sharp-edged annular poles terminating adjacent the inner axial ends of each of said field coil windings, said armature being mounted for rotation and reciprocation within said solenoid and being drivingly connected to said flyball mechanism, and said armature poles being normally offset from the poles of said magnetic housing so that energization of the field coil windings tends to cause the armature to be withdrawn into said solenoid housing with increasing force as said speed controlling member is moved in a direction to decrease the speed of said prime mover by said flyball mechanism.

9. In a centrifugal governor for a prime mover as set forth in claim 7, said solenoid device including a plurality of coaxially disposed annular field coil windings, the adjacent windings being oppositely wound to provide reversed polarity, an annular magnetic housing embracing said field coil windings and having sharp-edged annular poles terminating adjacent the inner axial ends of each of said field coil windings, said armature being mounted for rotation and reciprocation within said solenoid and being drivingly connected to said flyball mechanism, said armature having sharp-edged annular poles formed thereon coacting with and equally spaced with respect to the poles on said housing, and said armature poles being normally offset from the poles of said magnetic housing so that energization of the field coil windings tends to cause the armature to be withdrawn into said solenoid housing with increasing force as said speed controlling member is moved in a direction to decrease the speed of said prime mover by said flyball mechanism.

10. In a hydraulic speed governor for engines, wherein a servomotor-actuating pilot valve plunger is normally maintained in a neutral, non-valving position by relatively opposing axial action thereon of governor speed responsive means and controllable speed setting biasing means, the last mentioned means including electrically energizable means comprising a stationary solenoid coil unit having annular pole portions and a cooperating armature connected to the speed responsive means for rotation thereby and movable axially to oppose the speed responsive means, said armature being of generally cylindrical form and providing cooperating pole portions which, during equilibrium operation of the governor, are offset from the coil unit pole portions a desired working distance along the armature axis, the armature having a reduced diameter journal portion adjacent one end thereof and providing an axially facing surface, a nonmagnetic member mounted in fixed relationship to the coil unit and embracing said journal portion and bearing means associated with said nonmagnetic member for journalling and slidably embracing said journal portion of the armature, said nonmagnetic member magnetically isolating said bearing means and journal portion from the coil unit and providing an abutment for engagement with said armature surface to limit maximum displacement of the armature by the speed responsive means to such distance that the magnetic force acting on the armature does not decrease with armature displacement.

11. In combination with a hydraulic governor for engines having a pilot valve and a servomotor controlled thereby, a centrifugally responsive means and a speeder spring means operatively connected for balanced force biasing action in opposite directions on a movable element of the pilot valve, a variably energizable speed setting solenoid unit including a movable element connected to apply force to the pilot valve element in the direction of action of the speeder spring thereon, speed setting lever means connected to act on the speeder spring in a direction to cause variation of its effective force opposing the centrifugally responsive means, an adjustable stop means associated with said lever means and operable to limit speeder spring bias decreasing moment of the lever means to provide a minimum low speed setting position for the lever means, and a biasing spring operatingly connected with the lever means and acting thereon to assist the speeder spring yieldably to maintain contact between the lever means and the stop whereby the engine can be started at various precisely determinable low speeds without requiring energization of the solenoid unit or operating movement of the lever means.

12. In combination with a hydraulic governor as set forth in claim 11, said lever means comprising a first lever member pivotally supported at one end and extending across the axis of the speeder spring and having a region between the ends of the first lever member operatingly in contact with the spring axially of the spring, a rockshaft crosswise of the first lever member adjacent an end portion thereof opposite the pivotally supported end, a second lever member connecting the rockshaft with said opposite end portion of the lever member and arranged to enable angular movement of the rockshaft to result in speed setting movement of the first lever member, and adjustable means arranged to enable a given angular movement of the rockshaft to result in different speed settings being effected by corresponding movement of the lever, and said adjustable stop means acting to limit the speed setting angular movement of said rockshaft.

13. In combination with a hydraulic governor as set forth in claim 11, a second adjustable stop means associated with said lever means and operable for abutment with said lever means in various high speed setting positions of the lever means whereby the maximum speed of the engine associated with said governor may be controlled by said lever means independently of energization of said solenoid unit.

14. In a hydraulic speed governor for engines, a speed responsive means, an electrically energizable speed setting means, a servomotor-controlling pilot valve plunger normally maintainable in a neutral, non-valving position by relatively opposing axial action thereon by said governor speed responsive means and said electrically energizable speed setting means, said electrically energized speed setting means comprising a solenoid coil unit having annular pole portions and a cooperating armature operatively connected to the speed responsive means and movable axially to oppose the speed responsive means, said armature being of generally cylindrical form and providing cooperating pole portions which are normally offset from the coil unit pole portions a desired working distance along the armature axis during equilibrium operation of the governor, and abutment means for limiting maximum displacement of the armature by the speed responsive means to such distance that the magnetic force acting on the armature does not decrease with armature displacement.

15. In a hydraulic speed governor for engines as set forth in claim 14, adjustment means for varying said working distance to enable a given energization of said solenoid to result in a different speed setting of said governor.

16. In a hydraulic speed governor for engines as set forth in claim 14, adjustment means for varying said working distance to enable a given energization of said solenoid to result in a different speed setting of said governor, and a second adjustment means for varying the maximum displacement of said armature as permitted by said abutment means.

17. In a hydraulic speed governor for engines, as set forth in claim 14, adjustable means for limiting maximum displacement of the armature by the speed responsive means as permitted by said abutment means to such distance that the magnetic force acting on the armature does not decrease with armature displacement.

18. In a hydraulic speed governor for engines wherein a fluid-servomotor-actuating pilot valve plunger is maintained in a neutral position relative to cooperating fluid ports during steady state operation of the governor, an electrical solenoid device including a coil member and cooperating armature member, said members having respective cooperating pole portions defining an approximately constant air gap, one of said members being stationary and the other of said members being operatively connected to move the valve plunger axially with forces which vary according to energization of the solenoid coil when said pole portions are in a predetermined working or axial-force-exerting relationship offset from their magnetic neutral or no-axial-force-exerting relationship, said solenoid device constituting a self contained assembly adapted for installation and installed into the governor as a working unit, and said governor and unit assembly including means adapted to act on one of said solenoid device members for effecting progressive positional adjustment of the working offset between the members axially of the device.

19. The mechanism according to claim 18, wherein the coil member is stationary and the armature member is connected to the valve plunger through the intermediary of an element of fixed length, and said means for relatively adjusting the solenoid device members including adjusting screw means for shifting said armature member axially of said fixed length element and of said valve plunger.

20. The mechanism according to claim 18, wherein the coil member is stationary and the armature member is connected to the valve plunger through the intermediary of an element of fixed length, and said means for relatively adjusting the solenoid device members comprises adjusting screw means for shifting said armature and said fixed length element axially of said valve plunger.

21. In a speed governor for engines, wherein a servomotor controlling pilot element is adapted to be maintained in a neutral no-speed-changing position by relatively opposite balanced forces acting on the pilot element, a solenoid device comprising an armature member and a coil member, one member being stationary and the other being movable and connected to the pilot element for imparting solenoid magnetic force to the pilot element in opposition to one of the aforesaid forces, said members having pole portions cooperating to establish an air gap extending generally parallel to the direction of movement of the movable solenoid device member, said cooperating pole portions having a predetermined critical working or axial-force-exerting relative position along the air gap, adjusting means connected to move one member of the solenoid device relative to the other member in said direction of extent of the air gap and operative to cause said pole portions to occupy said working relative position when the pilot element is in its neutral position, and a pair of permanently exposed gauging surfaces on the solenoid device members, said gauging surfaces being so located relative to each other as to define a predetermined and measurable spaced relationship therebetween when the pole portions are in their said working relative position and the pilot element is in said neutral position.

22. In a speed governor for engines wherein a servo-motor-controlling pilot element is maintained in a neutral no-speed-change position during steady state operation of the governor, an electrical solenoid device including a coil member and cooperating armature member, said members having respective cooperating pole portions which define an approximately constant air gap, one of which members is stationary and the other of which is connected to move the valve plunger axially in one direction with forces which vary according to energization of the solenoid coil when said pole portions are in a predetermined working or axial-force-exerting relationship offset from their magnetic neutral or no-axial-force-exerting relationship, said solenoid device constituting a self contained assembly adapted for installation and being installed into the governor as a working unit, the governor and unit assembly including means adapted to act on at least one of said solenoid device members for effecting minute step or high precision relative positional adjustment between the members axially of the device, each of said solenoid device members having a gauging surface thereon exposed axially of the device, said gauging surfaces defining a first measurable predetermined axial relationship therebetween when the solenoid coil member is energized prior to installation in the governor and said gauging surfaces defining a second measurable predetermined axial relationship therebetween when said pole portions are in properly adjusted axial relationship and the governor is operating at steady state.

23. In a speed governor for engines wherein an element movable to control an engine speed change effecting servomotor is maintained in a neutral no-speed change position during equilibrium or steady state operation of the governor, a solenoid device including a coil and a cooperating armature member, said coil and armature members having coacting pole portions arranged to establish an approximately constant air gap, said armature member being connected to move the control element axially with forces which vary according to energization of the coil when said pole portions are in an axially offset or axial-force-exerting working relative position corresponding to the neutral position of said control element, a stationary guiding bearing member for the armature member, said bearing member and said armature member defining a predetermined axial relationship therebetween when said pole portions are in said axially offset working relative position, and means for effecting progressive axial adjustment in minute steps between one element of the solenoid device and the control element, so that any observed deviation from said predetermined axial relationship of said bearing member and said armature member during trial operation of the governor at steady state will indicate the amount and direction of adjustment necessary to coordinate solenoid device action with control element action.

References Cited in the file of this patent

UNITED STATES PATENTS

| | | |
|---|---|---|
| 267,446 | Mott | Nov. 14, 1882 |
| 588,666 | Stanley et al. | Aug. 24, 1897 |
| 1,784,517 | Farrand | Dec. 9, 1930 |
| 1,878,919 | Van Dam et al. | Sept. 20, 1932 |
| 2,026,994 | Messick | Jan. 7, 1936 |
| 2,643,871 | Warrick | June 30, 1953 |
| 2,715,528 | Schulte | Aug. 16, 1955 |
| 2,797,913 | Moulton | July 2, 1957 |